Patented May 31, 1949

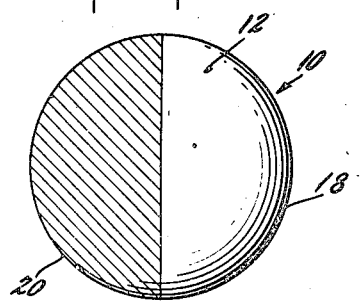
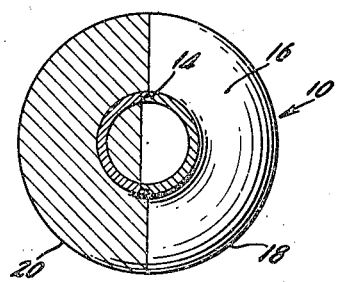
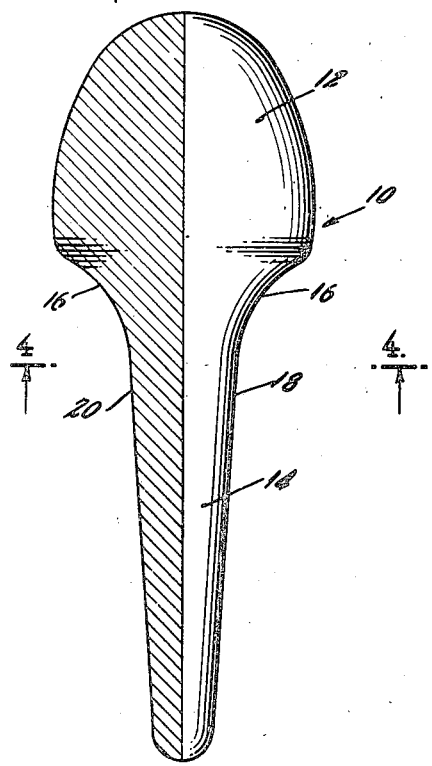
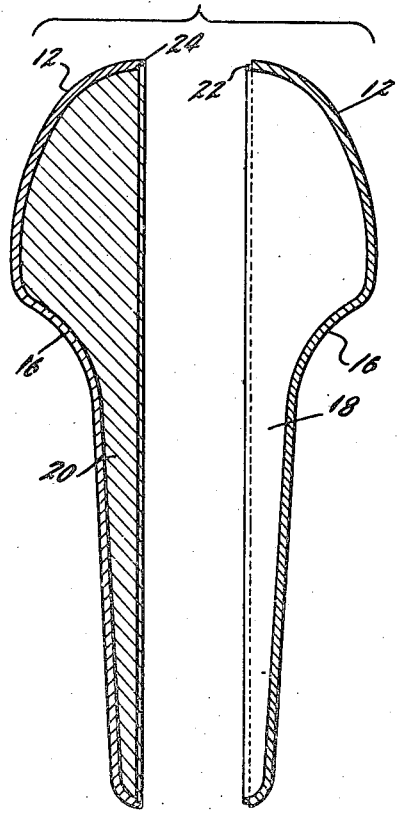

2,472,016

UNITED STATES PATENT OFFICE 2,472,016

MENDING DEVICE

Daniel C. Hungerford, Madison, N. J., assignor to Hungerford Plastics Corporation, New Providence, N. J., a corporation of New Jersey Application August 21, 1946, Serial No. 692,043

2 Claims. (Cl. 223—100)

My invention relates to improvements in devices for supporting and more or less stretching fabric during the mending thereof, such devices being commonly referred to as "darning eggs."

One of the objects of my invention is the provision of such a device, different portions of the external surface of which are of strongly contrasting colors, light and dark respectively, in order to provide contrast between the supporting surface of the device and the material or fabric being mended, regardless of the color of the latter. A further object of the invention is to construct the device of a plurality of sections of molded plastic material of different colors joined together. Preferably the sections are joined along longitudinal lines so that by making the respective sections of light and dark molded materials the device is divided symmetrically as to color. A further object of the invention is to provide the device with a handle portion having a dual function, so that it is not only useable as a handle but also as a supporting surface for the finger of a glove requiring mending, the handle being tapered for this purpose to provide suitable support for such an article. A still further object of the invention is to provide a device formed with a concave surface disposed between the tapered handle portion and the enlarged or head portion of the device having the usual convex surface of a typical darning egg.

Further objects and advantages of my invention will be apparent from the following description considered in connection with the accompanying drawing, of which:

Fig. 1 is a top end view of a preferred embodiment of my invention;

Fig. 2 is a side view of the device shown in Fig. 1;

Fig. 3 is a cross-sectional exploded view showing the two sections of the device; and Fig. 4 is a cross-sectional view taken on the line 4—4 of Fig. 2.

Referring to the drawings, reference character 10 designates generally a device embodying the invention. The enlarged head portion of the device is formed with a convex surface 12 having more or less the shape of an egg. Extending from the head portion is a handle portion 14 which as shown is preferably uniformly tapered throughout its length and joined to the convex head portion by means of a portion having a concave surface 16 of substantial radius of curvature which is advantageously, but not necessarily, arcuate but which in any event is of substantial extent.

In the embodiment shown in Fig. 3 the device is formed of two hollow half sections 18 and 20 which are joined along a central longitudinal plane. Section 18 has an inner flange 22 which fits within an outer flange 24 on section 20. Preferably these sections are of molded plastic material, as for example a cellulose derivative such as cellulose acetate. Other thermoplastic or thermosetting plastic materials may be employed. The parts are joined together by any suitable means but advantageously in the case of a thermoplastic the parts are joined by applying a solvent, such as acetone in the case of a cellulose acetate material, to the edges of the parts and then pressing them together. Obviously, the device can be made of more than two sections but ordinarily no advantage is to be derived by such procedure.

As indicated by the shading in the several figures the desired contrasting areas of the exterior surfaces are provided by making the different sections of different colored material. The different areas are preferably made of strongly contracting light and dark colors, as for example black or dark green or blue for one section and white, cream or a light pastel shade for the other section. Preferably the material of the different sections is colored throughout as is readily accomplished with molded plastic parts, but the desired object may be obtained by painting or otherwise coloring the external surface.

In the embodiment illustrated, when the two sections are joined together the resulting device is of strongly contrasting color on opposite sides and as is preferably the case the division between the contrasting colors is substantially symmetrically longitudinally of the device so that both the head and handle portions of the device have areas of contrasting dark and light coloring.

The device is advantageously used as follows:

In order to darn or otherwise mend fabric or other material, the material is wrapped around the head portion of the device with the hole or tear to be mended over the convex surface 12. The material is also caused to surround the handle portion 14 and may therefore be held in place by grasping the handle. Due to the concave formation of the surface 16 the material will not normally contact this portion of the device but may be brought into contact with and squeezed along the concave surface by closing the hand with which the handle is grasped. Thus by adjusting the force with which the device is grasped around this concave portion, the tension with which the material is stretched over the head portion may very readily be adjusted.

If the material to be mended is of light color the device is held so that the place requiring mending is located over a surface of dark color, whereas, if the material to be mended is dark in color a light area of the supporting surface is placed under the portion requiring mending. The contrast thus always available makes it much easier to clearly see the edges of the break in the material requiring mending and to effect the desired mend. As will be obvious the same procedure and advantages are available for mending the fingers of light or dark colored gloves for which the tapered handle portion provides a suitable support with contrasting light or dark surface areas.

While I have shown and described one more or less specific embodiment of my invention, it is to be understood that this has been done for purposes of illustration only and that the scope of my invention is not to be limited thereby, but is to be determined from the appended claims.

What is claimed is:

1. In a mending device providing surface for supporting material to be mended, a pair of elongated plastic sections united along a longitudinal center line to form a member having an enlarged head portion at one end and a conical handle portion at the other end, the enlarged head portion having a convex outer surface, the material of said longitudinal sections being formed of strongly contrasting light and dark colors, whereby the device may be easily rotated about its longitudinal axis to present a light or dark surface appropriately contrasting to the material supported.

2. In a mending device providing surface for supporting material to be mended, a pair of elongated plastic sections united along a longitudinal center line to form a member having an enlarged head portion at one end and a handle portion extending from said head portion, the enlarged head portion having a convex outer surface, the material of said longitudinal sections being formed of strongly contrasting light and dark colors, whereby the device may be easily rotated about its longitudinal axis to present a light or dark surface appropriately contrasting to the material supported.

DANIEL C. HUNGERFORD.

REFERENCES CITED

The following references are of record in the file of this patent:

UNITED STATES PATENTS

| Number | Name | Date |
|---|---|---|
| 1,055,783 | Nelson | Mar. 11, 1913 |

FOREIGN PATENTS

| Number | Country | Date |
|---|---|---|
| 7,330 | Great Britain | 1888 |
| 10,952 | Great Britain | 1903 |